D. G. BUTTS.
ENVELOP SEALING MACHINE.
APPLICATION FILED OCT. 8, 1908.

922,255.

Patented May 18, 1909.
7 SHEETS—SHEET 2.

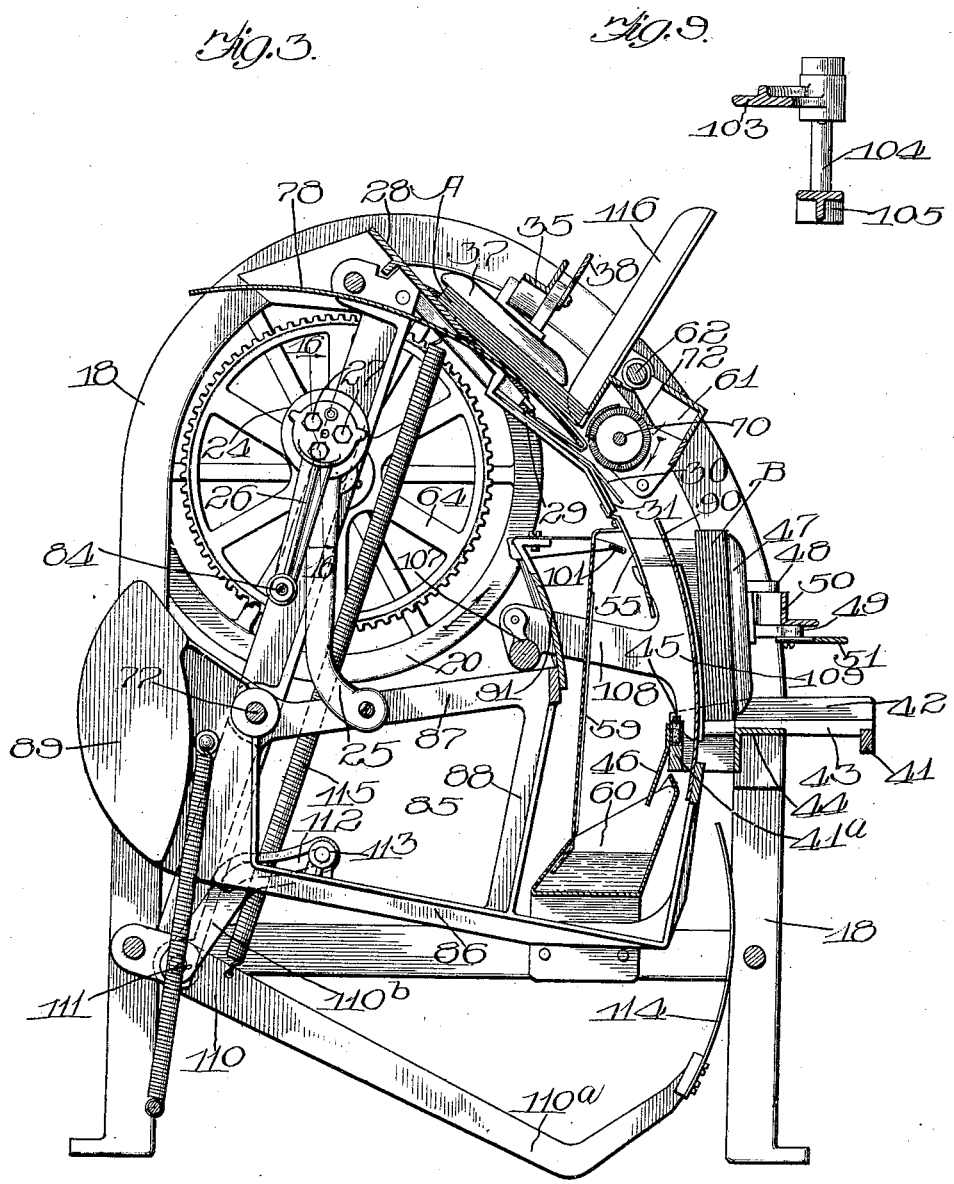

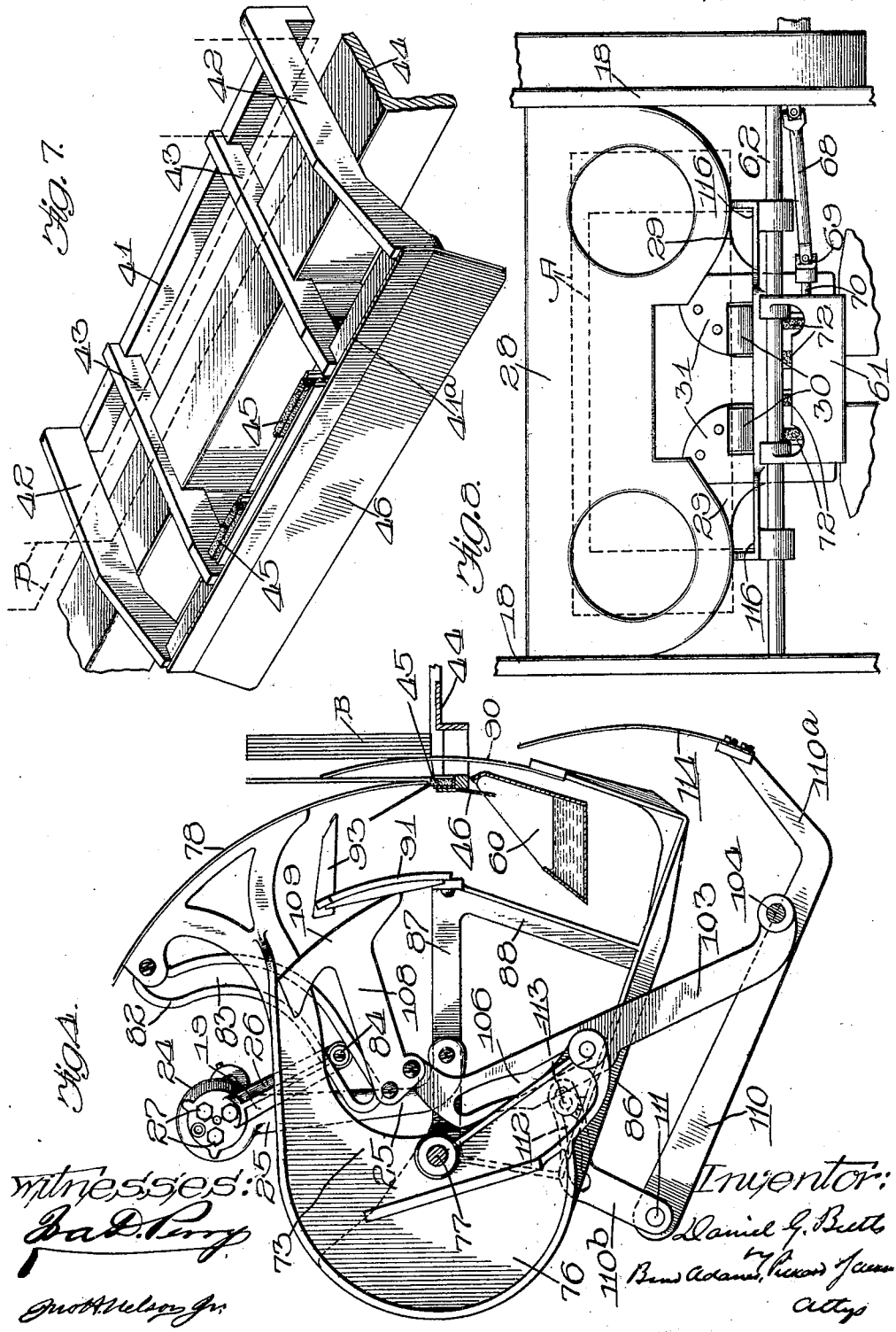

D. G. BUTTS.
ENVELOP SEALING MACHINE.
APPLICATION FILED OCT. 8, 1908.
922,255.
Patented May 18, 1909.
7 SHEETS—SHEET 5.
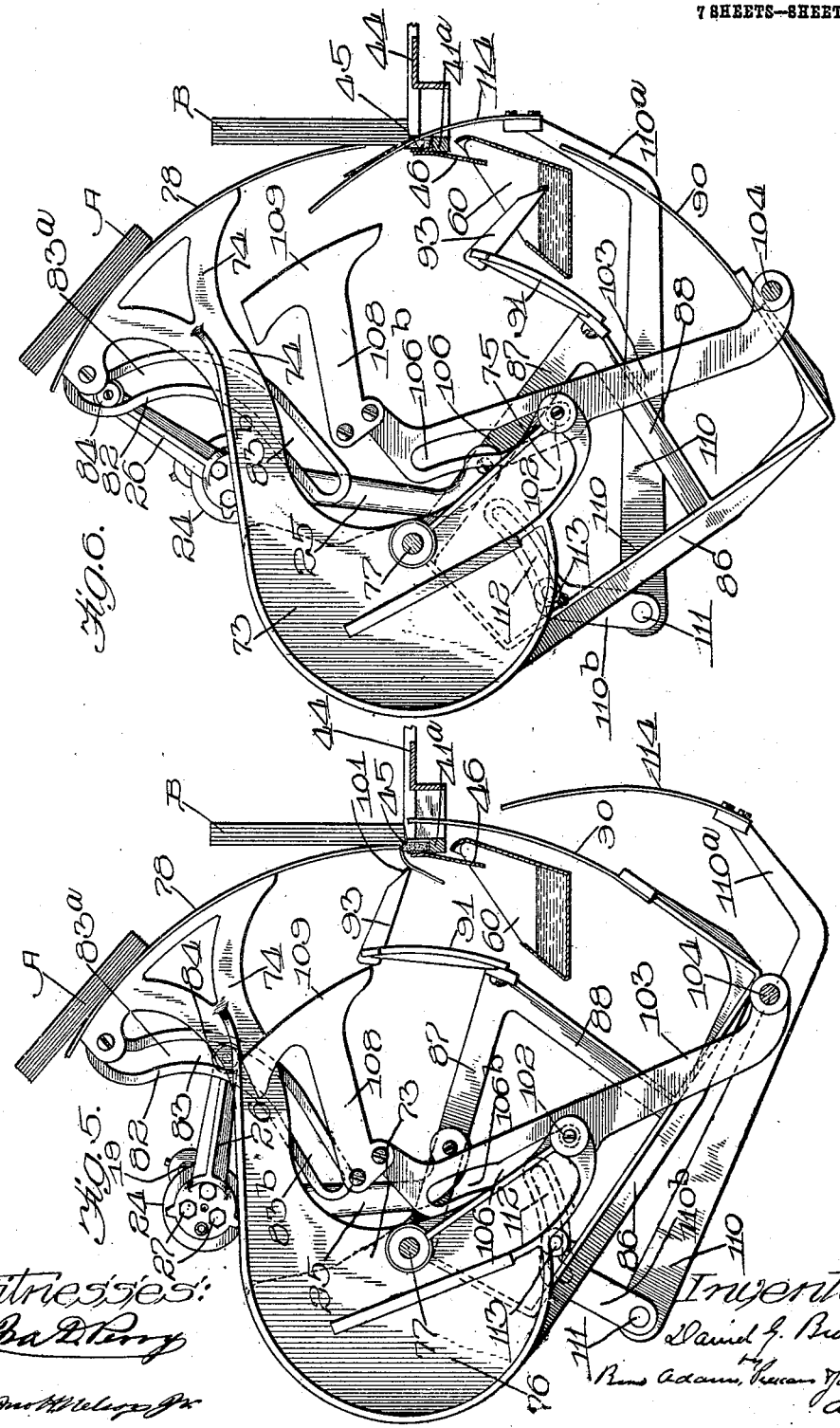

D. G. BUTTS.
ENVELOP SEALING MACHINE.
APPLICATION FILED OCT. 8, 1908.
922,255.
Patented May 18, 1909.
7 SHEETS—SHEET 6.
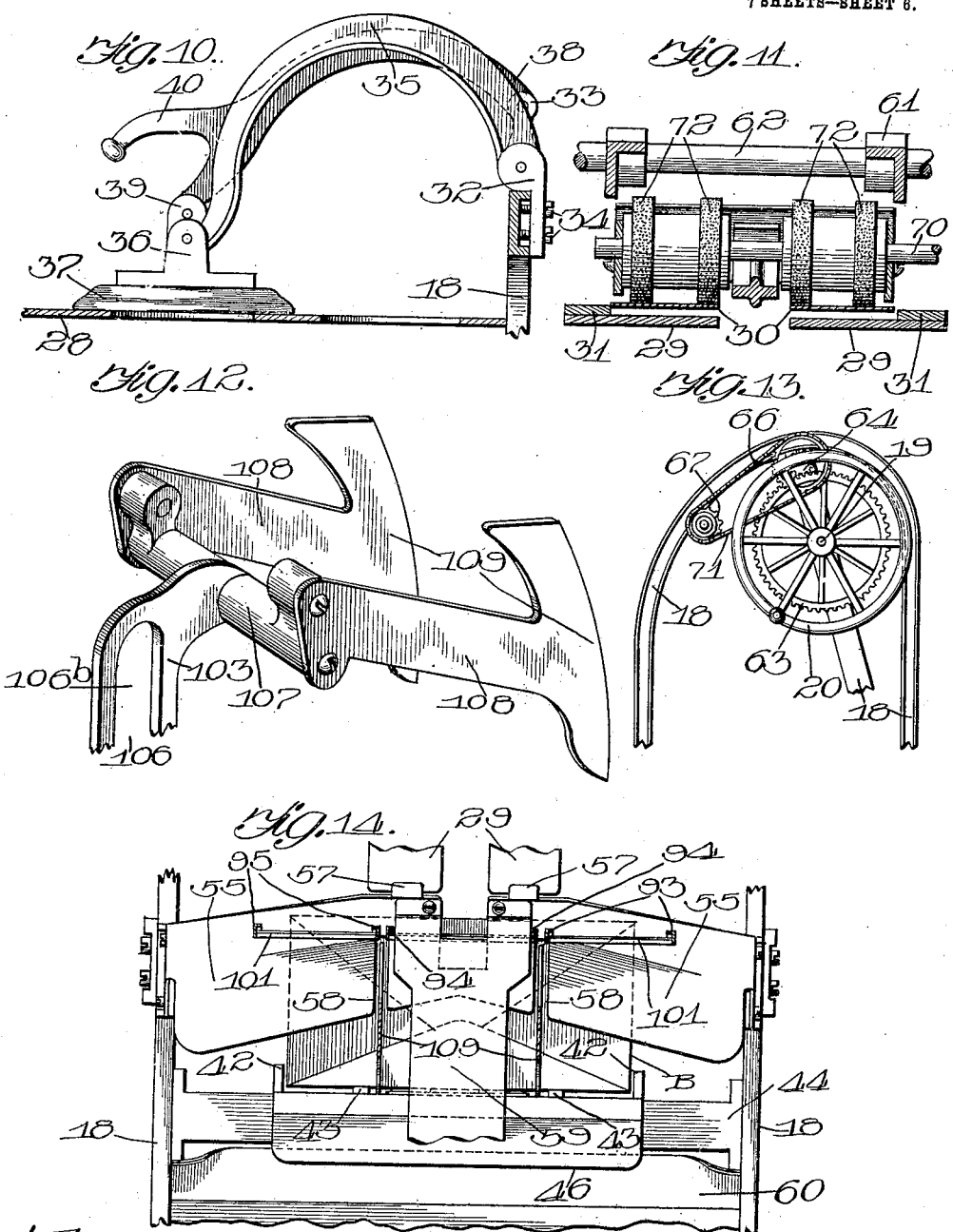

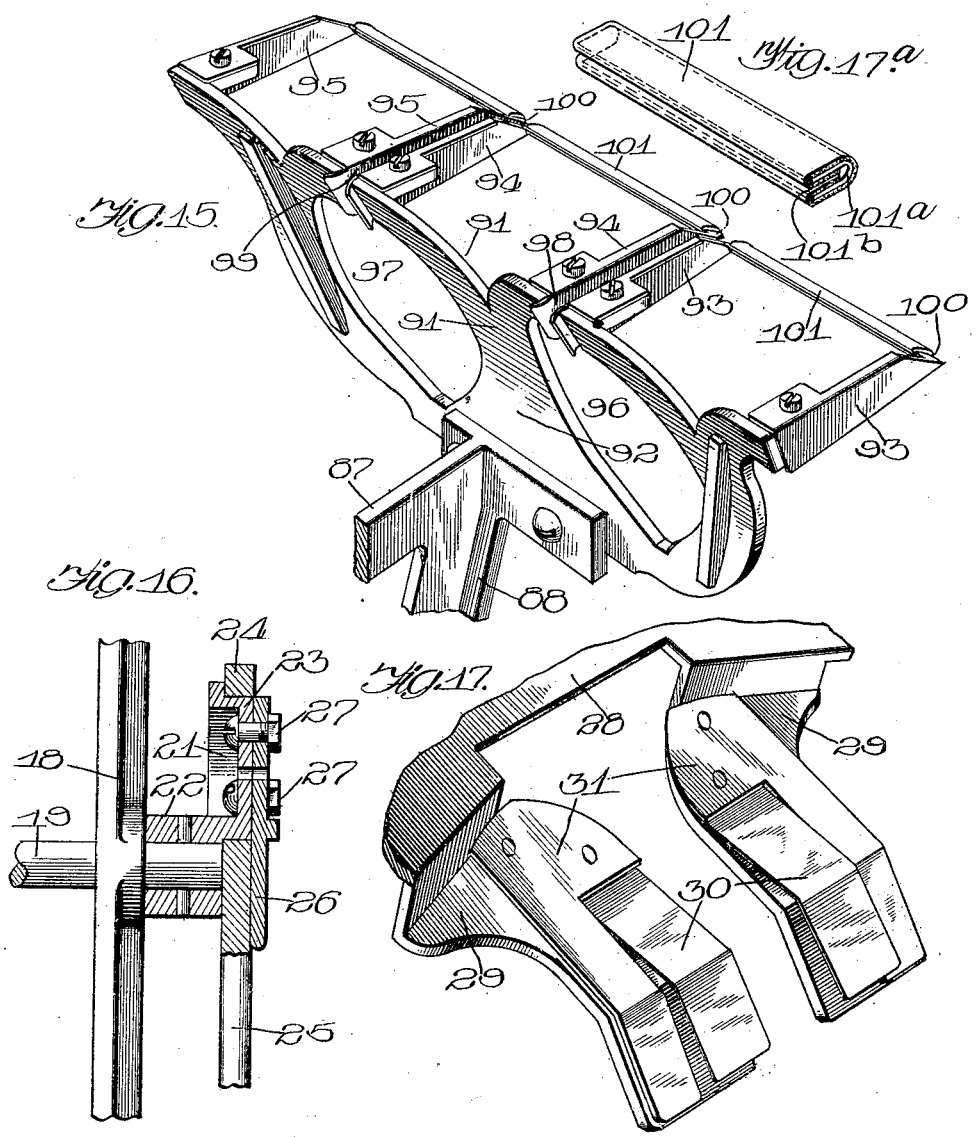

UNITED STATES PATENT OFFICE.

DANIEL G. BUTTS, OF CHICAGO, ILLINOIS, ASSIGNOR OF ONE-HALF TO HIMSELF AND ONE-HALF TO JOSEPH C. SEYL, OF CHICAGO, ILLINOIS.

ENVELOP-SEALING MACHINE.

No. 922,255.    Specification of Letters Patent.    Patented May 18, 1909.

Application filed October 8, 1908. Serial No. 456,737.

*To all whom it may concern:*

Be it known that I, DANIEL G. BUTTS, a citizen of the United States, residing at Chicago, in the county of Cook, State of Illinois, have invented certain new and useful Improvements in Envelop-Sealing Machines, of which the following is a specification, reference being had to the accompanying drawings.

My invention relates to envelop sealing machines and its object generally is to provide a new and improved machine by which envelops may be fed from a suitable supply table, have their gummed flaps moistened, the moistened flaps pressed upon the envelops, and the envelops delivered to a receiving table.

Specifically my invention consists of improvements of envelop sealing machines in a number of particulars hereinafter pointed out.

Figure 1:
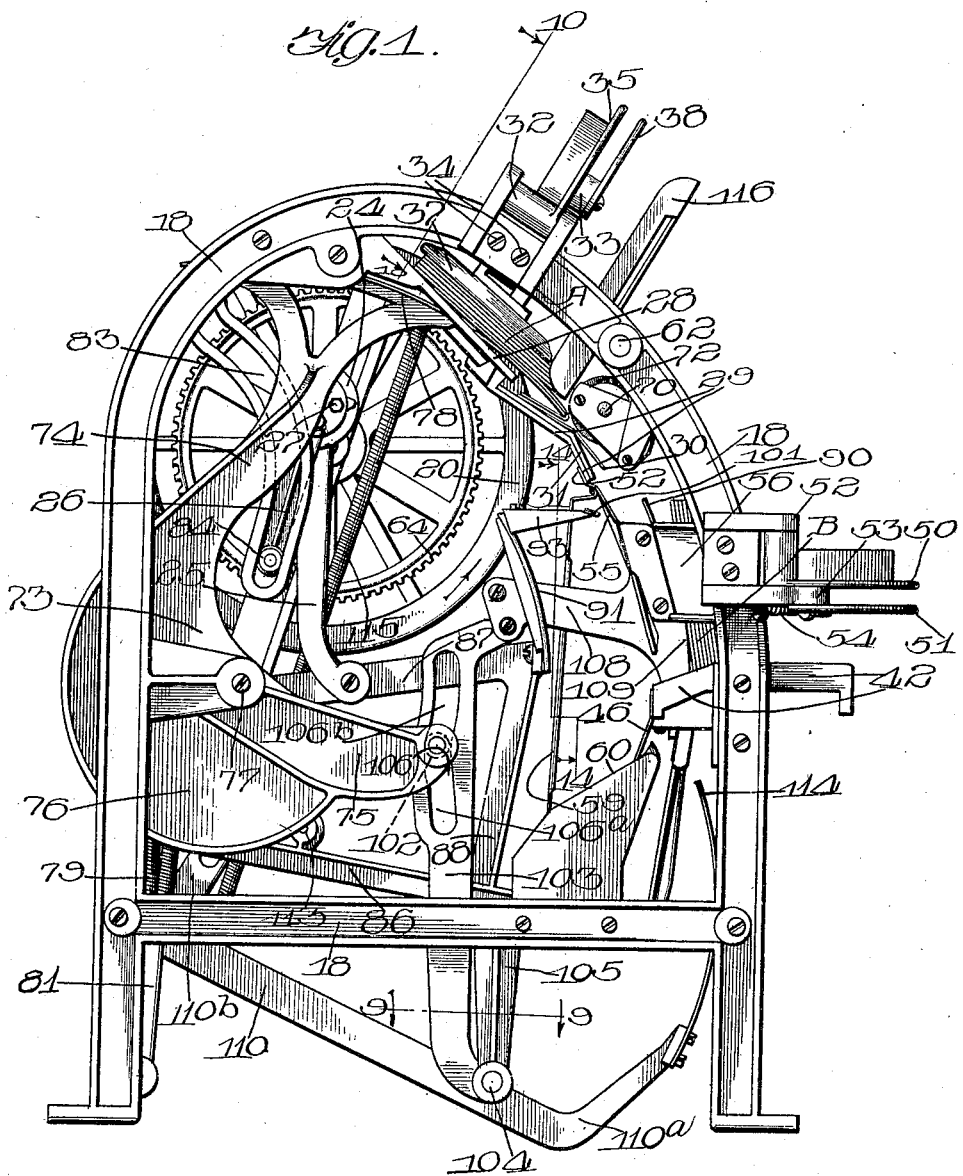
Figure 2:
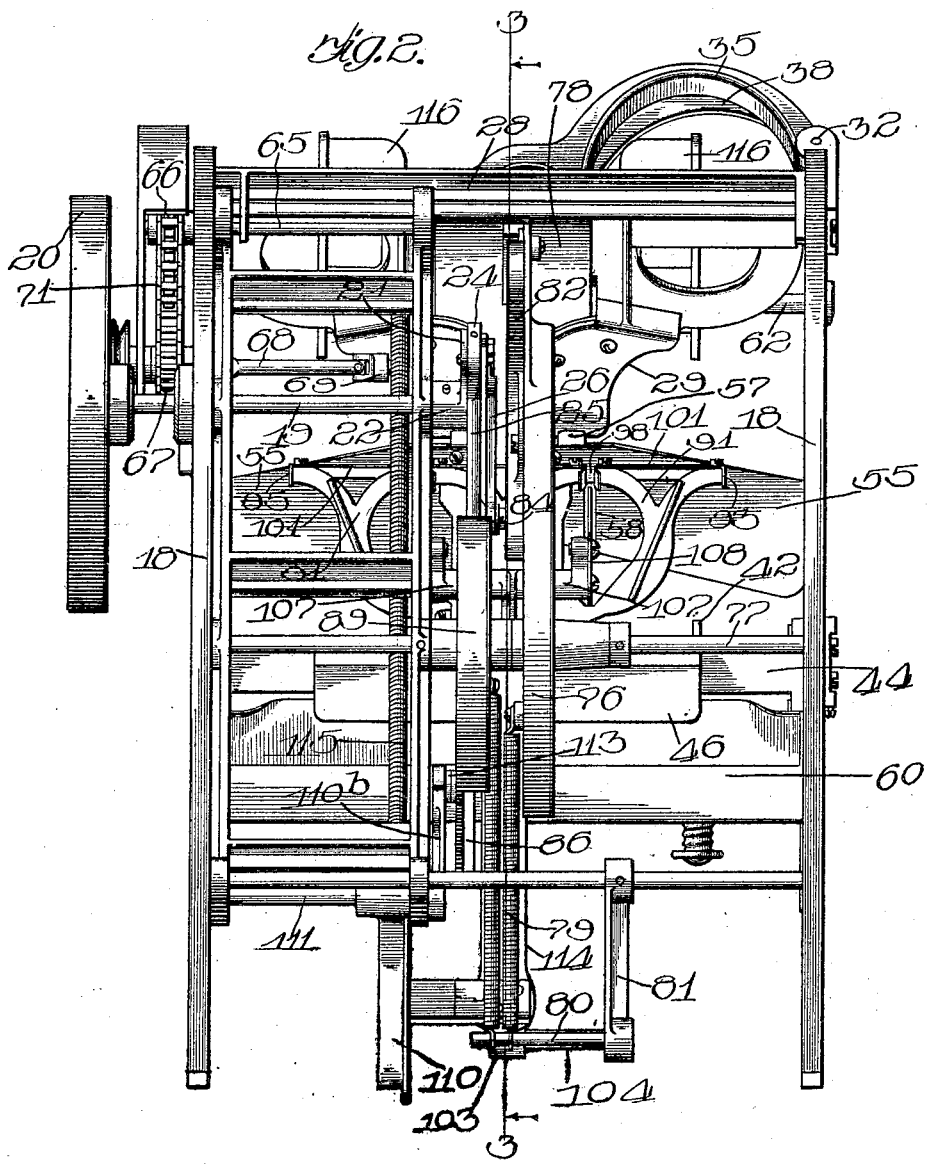

In the accompanying drawings:—Figure 1 is a side elevation. Fig. 2 is a rear elevation. Fig. 3 is a vertical section on line 3—3 of Fig. 2. Figs. 4, 5 and 6 are views of the principal operative parts of my invention with the frame and other parts omitted for the sake of clearness of illustration and showing the operative mechanisms in successive positions. Fig. 7 is an enlarged detail, being an isometric view of the receiving table. Fig. 8 is an enlarged detail, being a top or plan view of the supply table and of the brushing mechanism and support. Fig. 9 is a detail, being a section on line 9—9 of Fig. 1. Fig. 10 is an enlarged detail, being a view of the presser device for holding the pile of envelops. Fig. 11 is an enlarged detail of the brushes which bear upon the lead edge of the lower envelop of the pile. Fig. 12 is an enlarged detail, being a section on line 10—10 of Fig. 1. Fig. 13 is a detail, being a view of the brush-driving mechanism. Fig. 14 is a detail, being a section on line 14—14 of Fig. 1. Fig. 15 is an enlarged detail, being an isometric detail of the moistener. Fig. 16 is an enlarged detail, being a section on line 16—16 of Fig. 3, and showing the operating crank arms. Fig. 17 is an enlarged detail, being an isometric view of a part of the supply table, showing the spring plates which coöperate with the brushes in holding back the envelops. Fig. 17ª is a detail, being a view of the removable moistener.

Referring to the drawings,—18 indicates a frame on which the parts hereinafter mentioned are mounted.

19 (see Fig. 2) indicates a shaft which is journaled in the frame 18.

20 indicates a driving pulley or wheel which is mounted upon the outer end of the shaft 19 and may be driven by hand or by any suitable power, or the shaft 19 may be driven in any suitable manner, as by a motor mounted on the framework (not shown).

Referring to Figs. 2 and 16, where these parts are best shown, 21 indicates a crank which, by means of a hub 22, is secured upon the inner end of the shaft 19. The crank 21 is provided with a circular boss 23 upon which is journaled the head 24 of the connecting rod 25, the head 24 being annular shaped and fitting closely upon the circular boss 23. 26 indicates a crank arm which is secured to the crank 21 upon the exterior surface of the boss 23 in any suitable manner, as by bolts 27, the crank 21 being preferably recessed upon the side opposite from the boss 23, as is shown in Fig. 16.

28, as is best shown in Fig. 8, indicates a receiving table which is mounted in the framework 18 and slopes downward toward the receiving table hereinafter described. The supply table 28 is adapted to support a pile of envelops which are placed upon it flap downward for the purposes hereinafter described. The supply table 28 is supplied with arms 29, preferably integral therewith, slightly below the level of the supply table, as is best shown in Figs. 1 and 17, and are separated from one another to afford a passage above them and under the supply table for the feeding blade and between them for the arm of the feeding blade in its motion hereinafter described.

30 indicates springs which are secured to the arms 29 in any suitable manner, as by plates 31, and normally are raised above the surface of the arms 29 in the position shown in Figs. 1 and 17 so as to bear against the rotating brushes hereinafter described. The arms 29 project downward and forward toward the receiving table in the same general plane as the supply table.

Referring to Figs. 1 and 10, 32—33 indicate lugs or ears which are secured to the frame 18 in any suitable manner, as by screws 34. The lug 33 projects upward from the frame to a greater height than the lug 32. 35 indicates a curved arm which is pivotally connected at one end to the lug 32 and at the other end to a lug 36 secured to a presser-foot 37 which is adapted to bear upon the supply table 28, as is shown in Fig. 10, when no envelops are in place, or upon the top of a pile of envelops when in place upon the supply table. 38 indicates a curved arm one end of which is pivotally connected with the lug 33 and the other end to a lug 39 also secured to the presser foot 37 and projecting therefrom somewhat farther than the lug 36. 40 indicates a lifting handle on the arm 38. It will be seen that by the connections between the lugs 32 and 33 and the lugs 36 and 39 by the curved arms 35 and 38, when the arm 38 is moved upward by hand, the presser foot 37 will be moved away from the supply table and to such an extent as may be required by any ordinary pile of envelops will keep its lower surface parallel with the surface of the supply table. The distance during which this presser foot will keep its parallelism will depend upon the relative heights of the several lugs described, and is adjusted according to the desired capacity of the machine for holding envelops.

Referring particularly to Figs. 3 and 7, 41 indicates a receiving table which is formed of a series of parallel bars 42—43 which are secured to a suitable crossbar 44 of the frame 18. The inner ends of the bars 42—43 are beveled downward and backward so as to bring them into proper position for receiving the envelops on edge as they are thrust forward upon the receiving table after being moistened and sealed in the manner hereinafter described. The bars 42 are preferably made somewhat higher than the bars 43 and are adapted to receive larger envelops, while the bars 43 are adapted to receive smaller envelops between the bars 42, as is indicated by dotted lines in Fig. 7.
45 indicates bearing stops, preferably formed of rubber or of some other suitable material which are suitably secured in the rear crossbar 41ª of the receiving table 41, and are located between the bars 43.
46 indicates a plate which projects downward over the water trough hereinafter described.

47 indicates a presser foot which is connected by means of suitable lugs 48—49 with curved arms 50—51, respectively, the other ends of which are respectively connected to lugs 52—53 mounted on the framework 18.

54 indicates a spring (see Fig. 1) one end of which is connected with the frame and the other with the arm 51 forward of its pivot and tends to yieldingly maintain the presser foot against the pile of envelops delivered to it as hereinafter described. As this presser foot and its connections and supports are exactly like the presser foot and connected parts above described as bearing upon the supply table, it is believed that no further description of it is necessary.

Referring particularly to Figs. 1 and 14, 55 indicates a plate which is secured to suitable projections 56 projecting inwardly from the frame 18 above the receiving table 41. The plate 55 is provided on its upper edge near the center with two lugs 57 which bear upon the under side of the arms 29 of the supply table 28. The lower edge of the plate 55 is beveled upward and inward from both sides toward the center so as to afford a passage backward through it for the flap of the envelop, as is shown in Fig. 14, and as will be hereinafter described. It is also provided at a suitable distance each side of its center with vertical slots 58 to permit the forward passage through it of the pusher arms hereinafter described. The surface of the plate 55 is slightly curved to conform generally to the arc on which the feed blade hereinafter described travels, and is located in such a position that the under surface of the feed plate slides over it in the act of feeding an envelop, as hereinafter described, the supply table, its projecting arms, and the plate 55 being so located as to form a substantially continuous surface along which the under side of the envelop slides as it is being fed to be moistened as hereinafter described.

59 indicates a thin plate the upper end of which is secured to the back upper surface of the blade 55, and which projects downward into a water trough 60 which is supported on the frame 18 below and to the rear of the rear end of the receiving table 42 and extends across the machine from side to side.

Referring particularly to Figs. 1, 3, 8, 11 and 13, 61 indicates a housing which is secured upon a cross bar 62 mounted in the framework 18. 63 indicates a gear which is mounted upon the shaft 19 and secured thereto in any appropriate manner. 64 indicates a gear which meshes with the gear 63 and is journaled upon a suitable shaft 65 mounted in the framework 18. The gears 63 and 64 are just within one side of the framework 18 and in line therewith and hence are not shown in Fig. 2. 66 indicates a sprocket wheel which is integral with or secured to the hub of the gear 64 and rotated therewith. 67 indicates a sprocket wheel which is secured to a suitable shaft 68 which is journaled in the framework 18, and is connected by a universal joint 69 with a stub shaft 70 which is journaled in the housing 61. 71 indicates a spocket chain connecting sprocket wheels 66 and 67, thus driving the shaft 68 and stub shaft 70. 72 indicates brushes which are mounted upon the stub shaft 70 and rotate therewith in the direction indicated by arrows in Fig. 3 and bear normally upon the upper surface of the springs 30 preventing the slipping down of any envelop until forced down as hereinafter described, and preventing the delivery of more than one envelop at a time.

73 indicates a bell crank lever having arms 74 and 75, and which is provided with a counterweight 76 and is pivotally mounted on a rod 77 which is secured to the framework of the machine.

78 indicates a feeder plate which is formed of a thin strip of metal curved in the arc of the radius of the arm 74 of the bell crank lever 73 and secured upon the end of the arm 74. The arm 74 is of such length that as the bell crank lever is swung, as hereinafter described, the feeder plate 78 will pass through the opening at the end of the supply table 28 between the arms 29 substantially in contact with the under side of said table and in alinement with the under side of said table and in alinement with the under side of the pile of envelops thereon, the arm 74 swinging between the arms 29 so as to engage the flap of an envelop and carry the envelop downward as hereinafter described.

79 indicates a spiral spring one end of which is secured to any suitable portion of the framework, as a pin 80 secured to a depending bracket 81, and the other end of which is connected to the counterweight part 76 of the bell-crank lever 73 back of its pivotal point on the rod 77. The spring 79, so connected, is stretched and the counterweight is lifted when the arm 74 is rocked downward. The spring and the counterweight, therefore, tend to hold the bell-crank lever 73 in the position shown in Fig. 1, and when it is rocked so as to carry the arm 74 downward the spring and counterweight tend to restore the bell-crank lever to its normal position.

82 indicates an arm which is secured to the arm 74 and is provided with a cam-slot 83. The upper portion 83ª of this cam-slot is curved for a suitable portion of its length upon an arc which corresponds to the arc of travel of the end of the crank arm 26 when it is moving upward from the position shown in Figs. 4 and 5, as hereinafter described. The remainder 83ᵇ of the cam-slot is substantially straight.

84 indicates a roller which is journaled upon the end of the crank arm 26 and is adapted to travel in the cam slot 83.

As will be hereinafter more particularly described, the rotation of the crank arm 26 will operate to swing the bell crank lever 73 from its uppermost position, as shown in Figs. 1 and 3, to its lowest position, as shown in Figs. 4 and 5, and, after holding the said crank arm temporarily in the position shown in Figs. 4 and 5, will swing it back to its original position.

85 indicates a frame composed of bars 86, 87 and 88 and a counterweight 89, as is best shown in Fig. 3, and pivotally mounted upon the rod 77 adjacent to the bell crank lever 73. The bar 87 is pivotally connected with the connecting rod 25 whereby, as the shaft 19 is rotated, the frame 85 will be rocked on the rod 77 in the several positions shown in Figs. 1, 3, 4, 5 and 6.

90 indicates a curved plate which is secured to and projects upward from the outer end of the bar 86. The plate 90 is of sufficient width to come between the plates of the pusher hereinafter described, passing between the bars 43 of the receiving table 41, between the cross bar 44 of the frame and the bearing stops 45, and operating as hereinafter described as a plate which will separate the pile of envelops discharged upon the receiving table from the downward coming envelop fed by the feeding blade, the said plate 90, as is best shown in Fig. 4, coming between the pile of envelops previously delivered to the feeding table and the downward coming envelop.

Referring particularly to Fig. 15, where these parts are best shown, 91 indicates a frame composed of a plate 92, and a plurality of inwardly-extending bars 93—93, 94—94, 95—95, which, in the form in which my invention is embodied, are six in number arranged in three pairs. The plate 92 is provided with openings 96—97, with slots 98—99 at the top between the pairs of bars 93, 94 and 95, to permit the passage through the frame 91 and between the middle pair and the end pairs of bars of the pusher plate hereinafter described, as is seen, for instance, in Fig. 3. The pairs of bars 93—94—95 are connected by cross-strips 100, preferably formed integral with said bars. 101 indicates moisteners which are formed of any suitable water-absorbent material and are wrapped around or in any suitable manner secured to the bars 100. The swinging of the frame into its lowermost position, shown in Fig. 6, will dip the moisteners 101 into the water in the trough 60, and, the arm rising to the position shown in Fig. 3, upon its next descent the moisteners will moisten the flap of the envelop, as hereinafter described.

102 indicates a roller which is located on the inner side of the end of the arm 75 of the bell crank lever 73.

103 indicates an arm which is pivotally mounted upon a pin 104 secured to a bracket 105 depending from a suitable portion of the main frame 18, and projects upwardly therefrom. The arm 103 is provided with a slot 106, the lower end of which, 106ª, is straight, and the upper end, 106ᵇ, is curved on the arc which when the parts are in the position shown in Fig. 1 corresponds with the arc of movement of the end of the arm 75 while it is moving from the position shown in Fig. 1 to its uppermost position and down again into the position shown in Fig. 1. The slot 106 is engaged by the roller 102 on the arm 75. As the bell crank lever 73 is swung in the manner above described, the arm 103 is held in the position shown in Fig. 1 while the roller is traveling upward to the end of the upward movement of the bell crank lever 75 and until it descends to the position shown in Fig. 1 again. Upon the further downward movement of the bell crank lever, the arm 103 is rocked back into the position shown in Fig. 4, and forward again into the position shown in Fig. 1.

Referring particularly to Fig. 12, where these parts are best shown, 107 indicates a crossbar which is formed integral with or rigidly secured to the upper end of the arm 103. 108 indicates pusher plates provided with heads 109 and secured to the ends of the crossbar 107. The length of the crossbar 107 is such as to space the pusher plates 108 apart a distance equal to the distance between the slots 98—99 between the end pairs of bars 93 and 95 and the middle bars 94 on the moistener frame 91, and between the slots 58 in the plate 55, and they operate to close the moistened flap of the envelop and push the sealed envelop forward upon the receiving table in the manner hereinafter described, the said pusher plates in their forward motion passing between the end and middle pairs of crossbars and through the slots in the plate 55.

110 indicates a bell crank lever having arms 110$^a$ and 110$^b$ which is journaled upon a rod 111 suitably supported at the rear of the frame 18. The arm 110$^b$ is provided in its upper portion with a slot 112. The slot 112 is engaged by a roller 113 mounted near the inner end of the bar 86 of the frame 85, and is curved throughout the greater part of its length from its forward end toward its rear end in an arc which corresponds to the arc of travel of the roller 113 while the frame is being moved from its upper position shown in Fig. 3 to the position shown in Fig. 5, whereby, while the frame is traveling through that portion of its arc, the bell crank lever remains stationary in the position shown in Figs. 4 and 5. When the frame, however, rocks lower into the position shown in Fig. 6, the roller engaging the other portion of the slot quickly moves the arm 110$^a$ into the position shown in Fig. 6. As the frame 85 again rises, the roller bearing in the slot at first operates to quickly throw the arm 110$^a$ downward until, as it reaches its lowest position, the roller engages the curved portion of the slot, holding the arm 110$^a$ in its lower position during the passage of the roller through the curved portion of the slot.

114 indicates a narrow curved plate which is secured to the outer end of the arm 110, and which, when the arm 110$^a$ is rocked upward, passes over the top of the plate 90 which is preferably recessed upon its upper edge to insure the parts not being brought into contact, through the space between the bar 44 and the crossbar 41$^a$ of the receiving table 41, and, engaging the outer surface of the flap of the envelop which has just been moistened, pushes it back into the position shown in Fig. 6 ready to be engaged by the pusher plates,—all in the manner hereinafter described.

115 indicates a spiral spring, the lower end of which is connected to the bar 110$^a$ of the bell crank lever 110 and the upper end to the upper portion of the supply table or any other suitable portion of the frame and operates to assist and speed the upward motion of the arm 110$^a$.

116 indicates a frame which is supported upon the frame 18 just above the bars 29 of the supporting table 28 so as to leave a space below it for the passage between its under side and the plates 99 of the envelops as fed by the feed plate and operates to engage the front edges of the pile of envelops, as is best shown in Fig. 3.

The operation of the above-described mechanism is as follows:—A pile of envelops A of any desired number suited to the capacity of the machine is placed upon the supply table with their flap sides underneath, and with the flaps pointing upward, the pile being lightly pressed upon the table by the presser foot 37 which operates by its own weight to sufficiently hold the pile in place. The front edges of the pile of envelops rest against the frame 116, thus supporting the pile of envelops against sliding off the feed table. The drive wheel 20 and shaft 19 being set in motion, either by hand or by any suitable power, in the direction indicated by arrows in Figs. 1 and 3, the brushes 72 are rapidly rotated in the direction indicated by the arrow in Fig. 3, and, bearing against the exposed lead edges of the lower envelops of the pile and brushing against the spring plates 30, prevent the envelops from sliding downward through the open space until forced down as hereinafter described. Assuming the parts to be in the position shown in Figs. 1 and 3, the feeder plate 78 has at this moment been urged forward so that its lead end has entered between the flap and the body of the envelope, and is just beginning to feed it forward, as is best shown in said Figs. 1 and 3. The moistener frame 91 is in its uppermost position, the moisteners having been damped by their previous immersion in the tank 60. As the plate 78 descends with the rocking of the bell crank lever 73, the under envelop is carried downward by the feed plate, forcing down the spring plates 30 as it goes, the rotation of the brushes preventing any other envelop except the one engaged by the feed plate from passing through. As the feed plate continues to descend, it carries the envelop with it back of the plate 90 into the position shown in Fig. 4, where it presses the lower edge of the envelop down against the yielding stops 45. The roller on the crank arm 26 entering the curved portion of the slot 83, the bell crank lever 73 remains in the position shown in Fig. 4, holding the envelop firmly against the stops 45 during the moistening and flap replacing operations. The envelop thus being held against the stops, the moistener frame 91 thereupon descends, operated in the manner above described, and the moisteners 101 are brought downward over the gummed flap of the envelop, as is shown in Fig. 5. During this time, the frame 85 has been rocked downward so as to move the plate 90 out of the way and into the position shown in Fig. 5. As the frame 85 is rocked still farther downward in the manner above described, the moisteners descend into the water in the trough 60, into the position shown in Fig. 6, in which the frame 85 is shown in its lowest position. In the meanwhile, the roller on the crank arm 26 has reached the upper end of the slot 83 and the bell crank lever 73 is being rocked backward, raising the feed plate out of its engagement with the flap. As the feed plate passes out of engagement, the arm 110ª of the bell crank lever 110 is moved rapidly upward by the mechanism above described, and the plate 114 passing rapidly upward, into the position shown in Fig. 6, engages the outside of the flap of the envelop, lifting it into the position shown in Fig. 6, in position to be engaged by the pusher plates.

The parts are so located and timed that as soon as the flap of the envelop has been moistened as above described the arm 103 begins to move forward out of the position shown in Fig. 4, and the pusher plates 108 are moved forward, the heads 109 engaging the flap of the envelop from the rear, pressing the moistened flap against the body of the envelop, and, passing through the slots 58 in the plate 55, pushing the envelop forward against the pressure of the presser foot 47 upon the table 42, the pusher plates then being in the position shown in Fig. 3, which indicates the extreme forward limit of their movement. As the parts reach this position, the roller 102, as is shown in Fig. 1, is just entering the curved portion 106ᵇ of the slot 106. As this portion of the slot corresponds with the arc of the further upward travel of the roller 102, and its downward travel until it again reaches the position shown in Fig. 1, the pusher plates, it will be obvious, are held stationary, pressing the rear envelop against the presser foot 47, or against the pile of envelops, if previous envelops have been delivered. While the pusher plates are being thus pushed forward, and while they are being so held in position, the frame 85 again rises, carrying the moistener frame upward past the pusher plates into its upper position, the pusher plates passing through the slots between the end pairs and the middle pair of bars of said moistener frame. At the same time, the curved plate 90 is carried upward, passing just behind the forward edges of the pusher heads 109 and between the same, as is best shown in Fig. 3, thus, coming behind the front edge of the pusher heads and therefore behind the last envelop fed upon the receiving table, and rising in front of the descending feed-plate, insuring the separation of the pile of envelops on the receiving table from the next downward-coming envelop. While these operations are being performed, the crank arm 26 has rocked the feed plate 78 into its uppermost position some distance back of the position of the part shown in Figs. 1 and 3, ready to engage the next envelop on the supply table with its next forward motion. The parts are so timed and the plate 90 is of such length that it does not pass below the upper surface of the receiving table until after the lead end of the feed plate 78 has reached its lowest position and is holding the envelop firmly against the stops. As envelop after envelop is fed from the supply table, moistened and sealed, it is pushed out upon the receiving table, forming a pile of envelops B, Fig. 3, against the spring action of the presser foot 47. When the entire pile upon the supply table is fed, a new pile of envelops may be placed upon the table by lifting the presser foot 37 out of position and the sealed envelops may be removed from the receiving table 42 by lifting the presser foot 47.

Fig. 17ª shows the preferable form of my removable moistener. Referring to that figure, 101ª indicates a support which is preferably formed of a thin strip of metal bent longitudinally so as to provide a slot 101ᵇ, running longitudinally thereof. 101 represents a strip of absorbent fabric, preferably cloth, which is wrapped around the support 101ª with its free ends inserted in said slot. The moistener is then mounted on the frame by slipping the cross bar into the slot 101ᵇ.

What I claim as my invention and desire to secure by Letters Patent is:—

1. In an envelop sealing machine, the combination with a frame, driving mechanism, and an envelop support, of a receiving table mounted on said frame, a swinging arm mounted in said frame and connected with said driving mechanism, a feed plate on said arm adapted to engage an envelop flap and feed the envelop to said receiving table and temporarily hold said envelop in engagement with said receiving table, a flap moistener, mechanism for operating said flap moistener to moisten said flap while said envelop is held in engagement with said receiving table, and sealing mechanism adapted to close the moistened flap and push said envelop out upon said receiving table when freed from engagement therewith by said feed-plate.

2. In an envelop sealing machine, the combination with a frame, driving mechanism, and an envelop support provided with a slot, of a receiving table mounted on said frame, a swinging arm mounted in said frame, mechanism for swinging said arm, a feed-plate carried by said arm and adapted when said arm is swung to pass through the slot in said envelop support and engage the flap on the under side of an envelop resting on said envelop support and feed the envelop to said receiving table, means connected with said driving mechanism for causing said feed-plate to temporarily hold said envelop in engagement with said receiving table, a flap moistener, mechanism for operating said flap moistener to moisten said flap while said envelop is held in engagement with said receiving table, and pushing mechanism adapted to close the moistened flap and push said envelop out upon said receiving table when freed from engagement therewith by said feed-plate.

3. In an envelop sealing machine, the combination with a slotted supply table adapted to hold a pile of envelops, a drive shaft, means for driving said shaft, a crank arm on the end of said drive shaft, a receiving table and stops thereon, of a swinging arm pivotally mounted in said frame, a feed-plate on the end of said arm adapted when said arm is swung to pass through the slot in said supply table and between a portion of the top of said table and the envelops thereon and to engage the flap of an envelop, an arm secured to said swinging arm and provided with a cam slot adapted to be engaged by said crank to operate said swinging arm and feed said envelop downward to said receiving table against said stops and temporarily hold the same in engagement with said stops, a flap moistener connected with said drive mechanism and adapted to moisten the flap of an envelop while the same is held in engagement with said stops, and a pusher mechanism connected with said driving mechanism and adapted when said envelop is freed from engagement with said stops by the lifting of said feed-plate to seal said envelop and push the sealed envelop upon the receiving table.

4. In an envelop sealing machine, the combination with a frame, a supply table mounted in said frame and adapted to hold a supply of envelops, feeding mechanism adapted to engage the flap of the lowest envelop of the pile and withdraw the same from the pile, plates adapted to yieldingly bear upon the under surface of an envelop as it is being withdrawn and flap moistening mechanism, of a rotary brush located adjacent to said supply table and bearing upon said plates, and mechanism for rotating the same against the lower envelops of said pile to prevent the moving from said supply table of any envelop except the one engaged by said feeding mechanism.

5. In an envelop sealing machine, the combination with a frame, a support on said frame adapted to contain a pile of envelops, an envelop feeding mechanism adapted to engage the flap of the under envelop and remove the envelop from said support, flap moistening mechanism, pushing mechanism adapted to close the moistened flap and deliver the sealed envelop, and mechanism for operating said feeding, moistening and pushing mechanism, of a rotary brush adapted to bear upon the lead edge of the under envelops of the pile as they rest on said support, and mechanism for rotating said brush against said pile of envelops.

6. In an envelop sealing machine, the combination with a frame, a supporting table mounted on said frame and adapted to support a pile of envelops, spring plates on said table bearing against the under side of said pile of envelops, a feed plate adapted when operated to pass above said spring plates and below the under surface of the lowest envelop of the pile and engage the flap of the envelop and forward said envelop by its flap thus engaged from said supporting table, flap moistening mechanism, and mechanism adapted to seal the moistened flap and deliver said sealed envelop, of rotary brushes bearing against said springs and against the lead edges of the lower envelop of said pile, and mechanism for rotating said brushes against said envelops.

7. In an envelop sealing machine, the combination with a main frame, a support on said frame adapted to hold a pile of envelops, a swinging arm mounted on said frame, a feed plate on the end of said arm adapted when said arm is swung to engage the flap of the lowest envelop of said pile and remove the envelop from said support, stops mounted on said frame, a receiving table, and driving mechanism adapted to operate said swinging arm and to hold the same with its engaged envelop against said stops, of a water trough mounted on said main frame, a swinging frame pivoted on said main frame, connections between said swinging frame and said driving mechanism adapted to swing said swinging frame on its pivot, envelop moistening devices carried by said swinging frame and adapted as it swings to alternately dip said moistening devices into said water trough and carry said moistening devices over the flap of the envelop while it is held upon said stops by said feed-plate, automatically-operated means adapted to lift the envelop flap after the same has been moistened, a swinging arm pivoted on said main frame and connected with said driving mechanism, and pusher plates carried by said arm and adapted as said arm is swung to engage the moistened flap of said envelop after it is freed from engagement with the feed plate to press said moistened flap against the body of the envelop and deliver said envelop sealed upon said receiving table.

8. In an envelop sealing machine, the combination with a main frame, a support on said frame adapted to hold a pile of envelops, a swinging arm mounted on said frame, a feed plate on the end of said arm adapted when said arm is swung to engage the flap of the lowest envelop of said pile and remove the envelop from said support, stops mounted on said frame, a receiving table, and driving mechanism adapted to operate said swinging arm and to hold the same with its engaged envelop against said stops, of a water trough mounted on said main frame, a swinging frame pivoted on said main frame, connections between said swinging frame and said driving mechanism adapted to swing said swinging frame on its pivot, envelop moistening devices carried by said swinging frame and adapted as it swings to alternately dip said moistening devices into said water trough and carry said moistening devices over the flap of the envelop while it is held upon said stops by said feed-plate, a plate, means for automatically moving said plate against the envelop flap and lifting the same after the same has been moistened and immediately retracting said plate, a swinging arm pivoted on said main frame and connected with said driving mechanism, pusher plates carried by said arm and adapted as said arm is swung to engage the moistened flap of said envelop after it is freed from engagement with the feed plate to press said moistened flap against the body of the envelop and deliver said envelop sealed upon said receiving table, presser mechanism adapted to yieldingly press upon the pile of envelops upon said support, and presser mechanism adapted to yieldingly press against the forward face of said envelops against the action of said pusher plates as the same are delivered to said receiving table.

9. In an envelop sealing machine, the combination with a support adapted to hold envelops, and means for engaging the flap of the under envelop forwarding the envelop and temporarily holding the said envelop stationary, of a receptacle adapted to contain a moistening fluid, a frame, a moistening device on said frame, and means for alternately dipping the moistener on said frame into said receptacle and moving the wetted moistener across the flap of the envelop while the same is held stationary by the forwarding device.

10. In a moistening device for an automatic envelop sealing machine, the combination with a frame and means for operating the same, of a bar on said frame, and a longitudinally-folded plate adapted to support an absorbent material, and adapted with said absorbent material to be removably slid upon said bar.

11. In a flap moistening mechanism for an automatic envelop sealing machine, the combination with a moistener frame and means for operating the same, of a bar on said moistener frame, a support having a longitudinal slot adapted to receive said bar, and a strip of absorbent fabric wrapped around said support and having its ends engaged in said slot and adapted to be held in place by the engagement of said bar in said slot.

12. In an envelop sealing machine, the combination with a support adapted to hold a pile of envelops to be sealed, a delivery table adapted to hold a pile of sealed envelops, an envelop feeder adapted to engage the flap of an envelop to be sealed and forward the same to said delivery table, and flap moistening mechanism, of pusher mechanism adapted to close the moistened flap of the envelop and push it forward upon the delivery table, a plate, and means for moving said plate between the last sealed envelop and the path of travel of envelop feeder to separate the sealed envelop from the next envelop fed to the delivery table.

13. In an envelop sealing machine, the combination with a frame, a support on said frame adapted to receive a pile of envelops, a receiving table carried by said frame, a swinging arm mounted on said frame, a feed-plate on said swinging arm adapted to engage the flap of an envelop, mechanism adapted to move said arm to forward the envelop engaged by said feed-plate to said delivery table, and flap moistening mechanism, of pusher mechanism adapted to engage the envelop after the flap is moistened and feed the same to said delivery table, a swinging arm mounted on said frame, a separator plate on said swinging arm adapted as said arm is swung to pass behind the lead end of said pusher mechanism and in front of said feed-plate as a fresh envelop is fed to said receiving table, and means for operating said swinging arm and separator plate.

DANIEL G. BUTTS.

Witnesses:
W. D. TROYER,
WM. F. VOORHIES.